March 31, 1931.  E. H. DONNAN  1,798,315
MANURE LOADER
Filed Aug. 3, 1928  5 Sheets-Sheet 1

Inventor
E. H. Donnan
By Clarence A. O'Brien
Attorney

March 31, 1931. E. H. DONNAN 1,798,315
MANURE LOADER
Filed Aug. 3, 1928 5 Sheets-Sheet 3

Inventor
E. H. Donnan
By Clarence A. O'Brien
Attorney

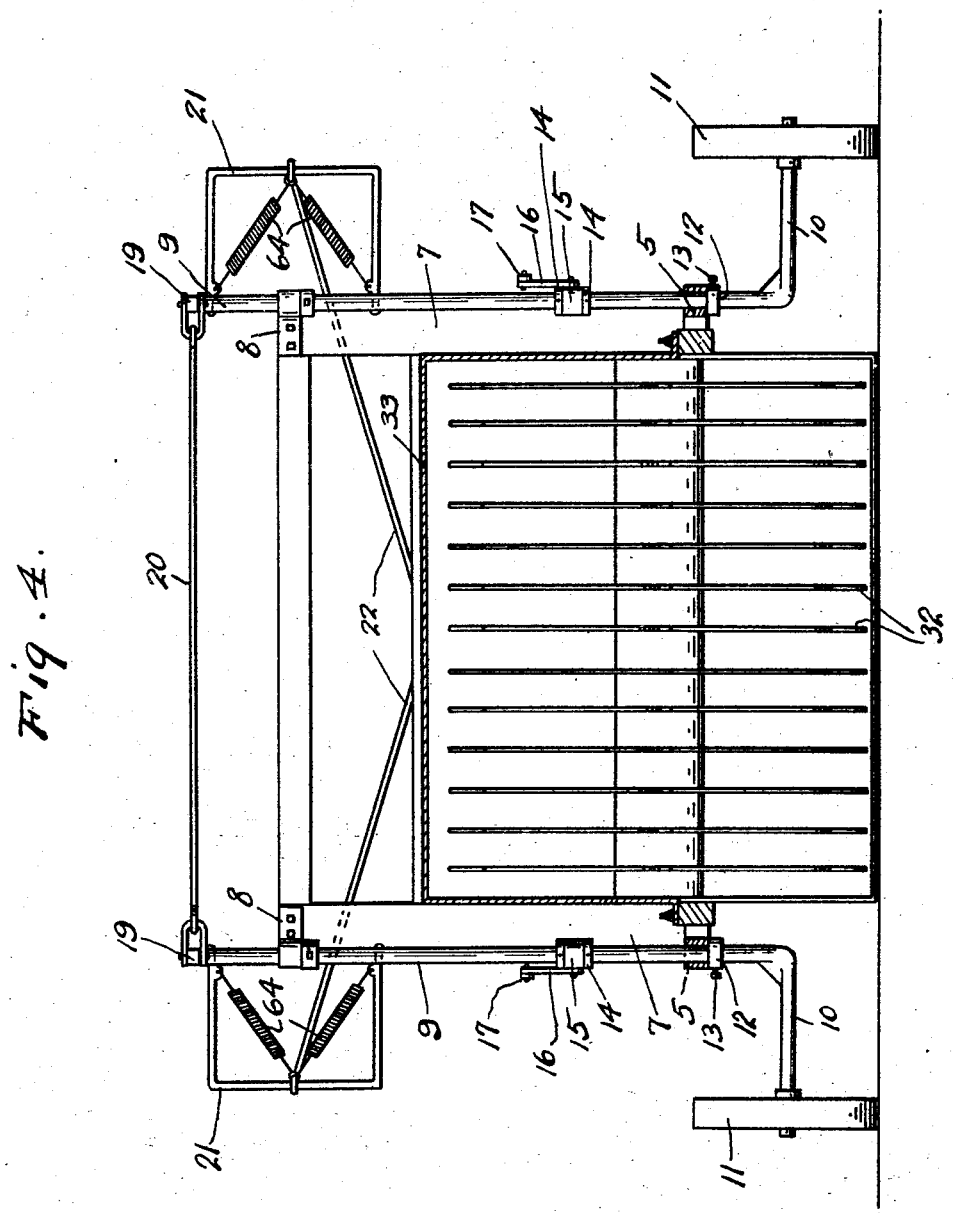

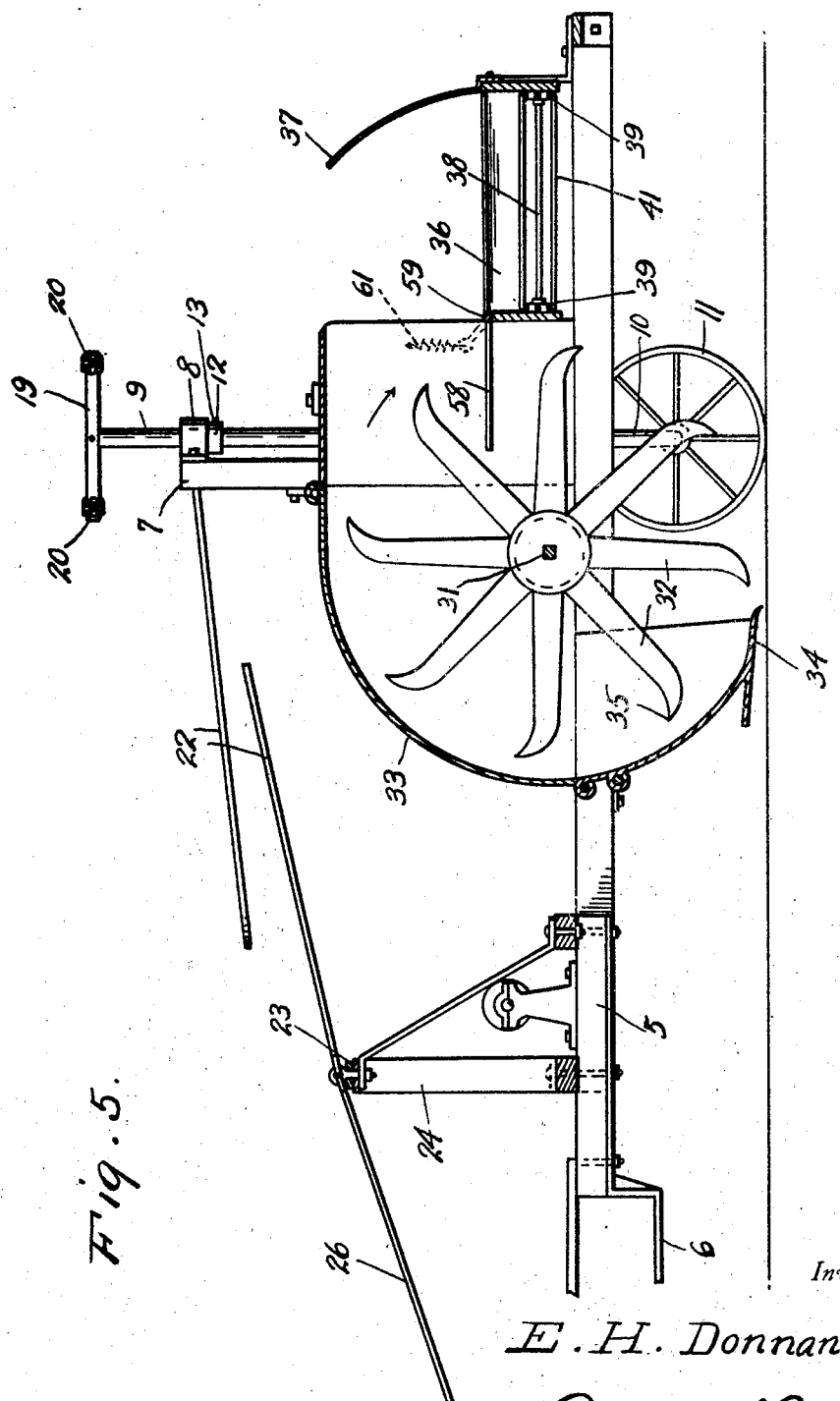

Patented Mar. 31, 1931

1,798,315

UNITED STATES PATENT OFFICE

EARL H. DONNAN, OF CHESTNUT, ILLINOIS

MANURE LOADER

Application filed August 3, 1928. Serial No. 297,172.

The present invention relates to manure loading machines, and has for its principal object to provide a tractor operated vehicle of this character provided with a rotating loading fork operable through the tractor and adapted to load the material upon a conveyor arranged for feeding the same transversely of the machine, and depositing the material into the spreader.
An important object of the invention is to provide a machine of this character, embodying a frame upon which the loading forks are rotatably mounted, and providing means for vertically adjusting the frame, whereby to regulate the depth at which the forks are operated.

Another important object of the invention is to provide means for steering the wheels upon which the machine is mounted from a position upon the tractor.

A still further object is to provide a drive connection for the conveyor as well as the rotating loading fork with the engine of the tractor.
An additional object is to provide a scoop disposed adjacent the loading fork for scraping up the material before engagement by the fork, and also to provide a cleaning device for the teeth of the fork mounted for pivotal movement, whereby to prevent injury to the teeth of the fork or the cleaner, should the fork pick up solid material during the operation thereof.

Another object is to provide a machine of this character of a simple and practical construction, which is efficient and reliable in performance, which may be quickly and easily detached from the tractor, when desired, in order to permit the use of the tractor for other work, relatively inexpensive to manufacture, and otherwise well adapted to the purposes for which the same is intended.

Other objects of the invention will become apparent as the nature of the invention proceeds and when taken in connection with the accompanying drawings.

In the drawings:

Figure 4 is a vertical transverse sectional view, taken at a position immediately forwardly of the loading fork, and looking in a rearward direction.

Figure 5 is a longitudinal sectional view, and

Figure 6 is a perspective view of the connector between the steering mechanism of the tractor and the steering mechanism of the loading machine.

Figure 1:
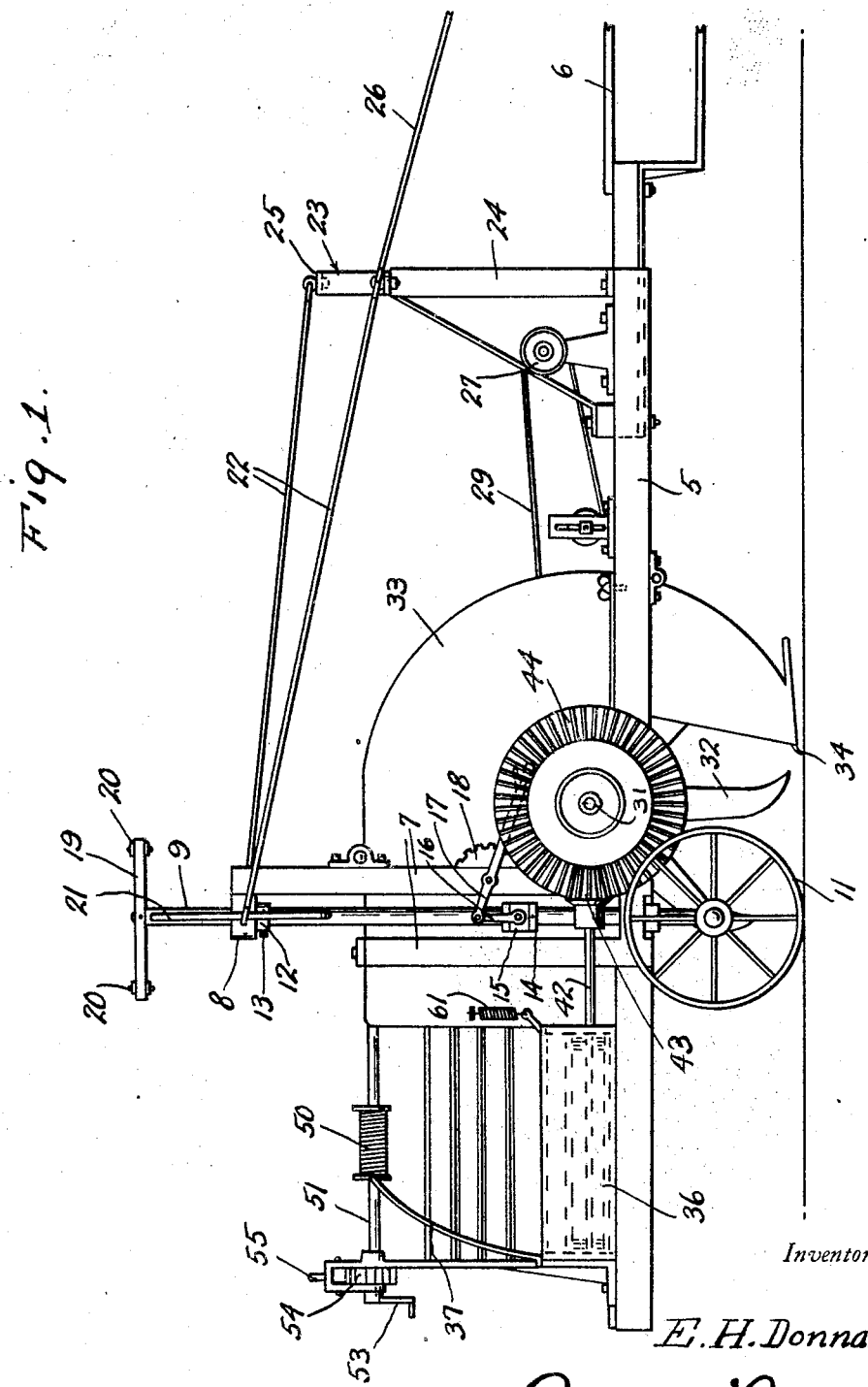
Figure 1 is a side elevational view of the machine taken from one side thereof.
Figure 2:
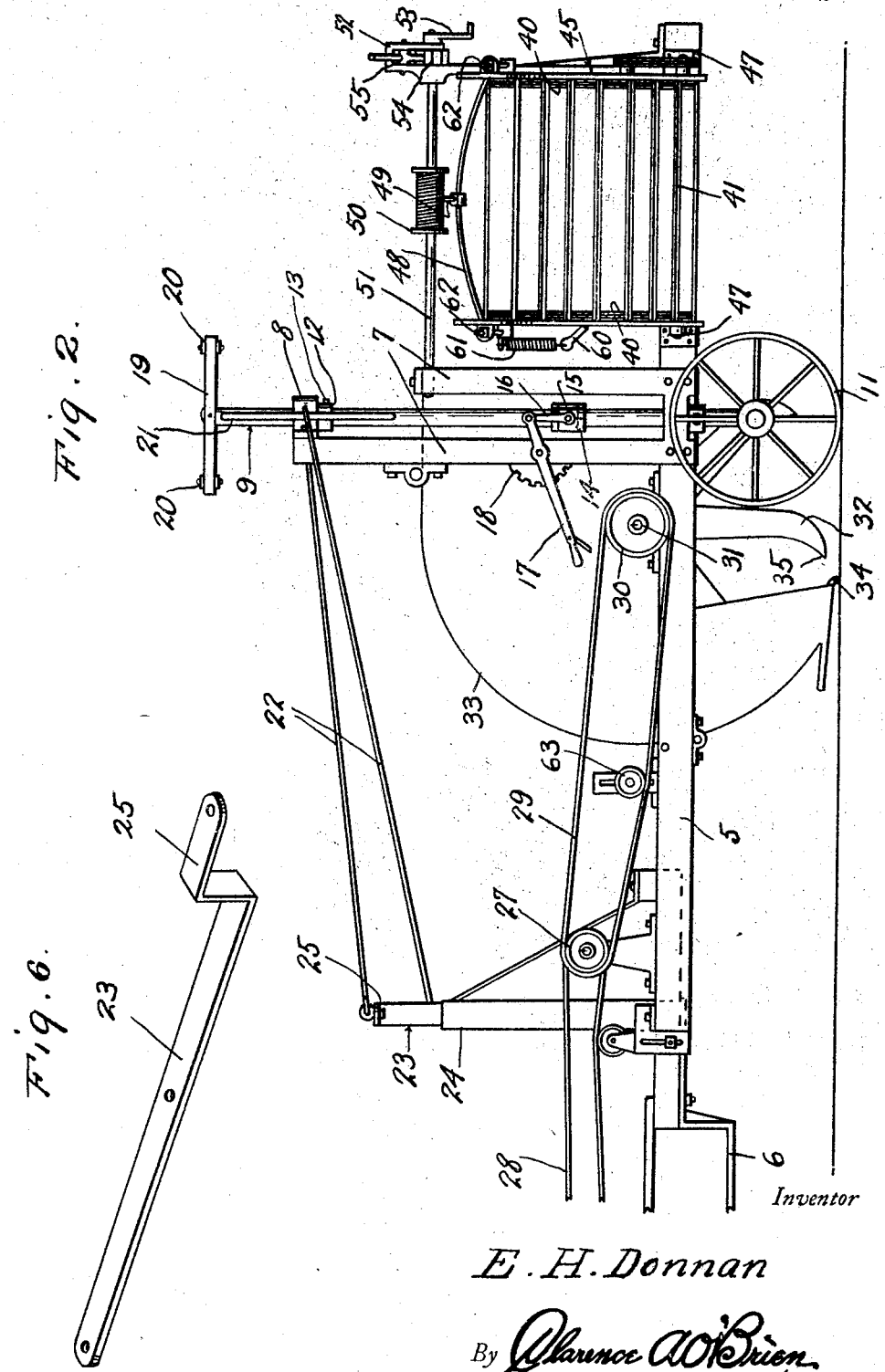
Figure 2 is a similar view, taken from the opposite side of the machine.
Figure 3:
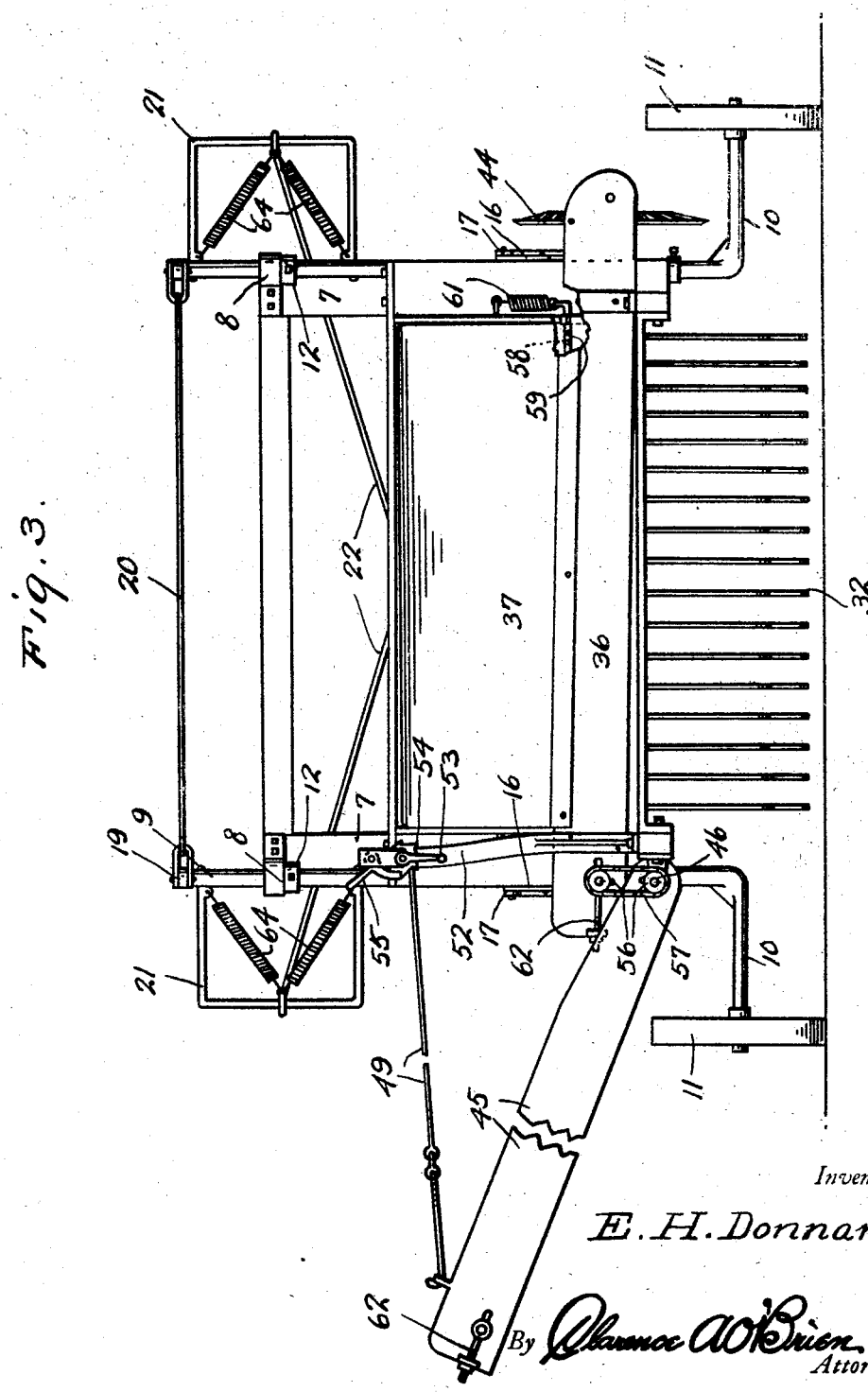
Figure 3 is a front elevational view.

Referring now to the drawings in detail, for the purpose of illustration I have disclosed a preferred embodiment of the invention, and includes a frame 5, to the one end of which is attached a coupling 6, by means of which the frame may be attached to a tractor or other power vehicle. Intermediate the ends of the frame is a pair of spaced apart uprights 7, one of said uprights extending upwardly above the other of said uprights and adjacent its upper end is provided with a guide 8, a pair of said uprights with a guide 8 being disposed at the opposite sides of the frame, and through each of the guides 8 is slidably inserted the vertically disposed end of an L-shaped member 9, having its lower horizontal portion 10 formed into an axle for rotatably supporting a wheel 11. The lower portion of the vertical section of the member 9 is also slidably inserted through an opening formed in the frame 5, a pair of collars 12 being secured to the vertical portion of said members immediately beneath the guide 8 and frame 5, whereby to limit the downward movement of the frame with respect to said members. The collars 12 may be adjustably secured on the members 9 by set screws 13. The vertical portion of the member 9 is also provided with a pair of spaced apart collars 14, fixedly secured to said member and between which is positioned a sleeve 15 adapted for relative rotary movement with respect to the member, said sleeve having a link 16 attached thereto and extending upwardly therefrom and with its upper end pivotally connected to the lever 17.

The lever 17 is pivotally attached to one of the uprights 7 of the frame and is operatively associated with a quadrant 18, by means of which the lever is secured in a predetermined adjusted position. It will be apparent that through the operation of the lever 17, the entire frame 5 may be adjusted vertically with respect to the members 9. The vertical portions of the members 9 are also adapted for rotary movement with respect to the guide 8 and frame 5, and by reason of such movement, the axles 10 carrying the wheels 11 may be pivoted about a vertical axis so as to permit the steering of the frame. The members 9 are connected for uniform rotary movement by means of a horizontally disposed longitudinally extending head 19, attached at the upper end of each of the members 9 and with the forward and rearward ends of the respective heads connected to each other by transversely extending rods 20. Extending outwardly from the side of each of the members 9 adjacent the upper end thereof in a U-shaped bracket 21 having its intermediate portion disposed vertically and to which one end of a pair of rods 22 are attached. The rods 22 are crossed intermediate their ends and have their opposite ends attached to a link 23.

The link 23 is pivotally mounted intermediate its ends at the top of an upright 24 carried by the frame, said link being disposed transversely of the frame. One end of the link 23 is offset vertically, as shown at 25, whereby to raise one of the rods 22, above the other thereof and prevent interference between the rods upon the pivotal movement of the link. To one side of the link 23 is also attached the one end of an operating rod 26, with its opposite end extending toward the tractor or other power vehicle for operation by the driver thereof.

It will thus be apparent that the steering of the machine may be controlled through the wheels 11 by the operation of the rod 26. At the forward end of the frame 5 adjacent the tractor is rotatably mounted a pulley wheel 27 having a drive belt 28 extending therefrom, for operation by the tractor or other vehicle, in any suitable manner well known in the art. A belt 29 is driven from the pulley 27 and extends about a pulley 30, mounted at one end of a transversely disposed shaft 31. The shaft 31 is journaled for rotation upon the frame 5 and is of a square shaped formation intermediate its ends as clearly illustrated in Figure 5 of the drawings, and upon which is rotatably mounted a series of spaced apart loading forks 32. The loading forks 32 are partially covered by a shield 33, disposed at one side of and above said fork, the lower edge of said shield being formed into a scoop 34, adapted to engage the material over which the machine passes in order to scoop up the material into a position for engagement by the ends of said forks. The forks 32 are adapted for movement in a direction, as indicated by the arrow in Figure 5 of the drawings, and the outer ends of the forks extend forwardly of the direction of rotation in order to facilitate the picking up of the material as the forks engage the same. The material engaged by the fork is accordingly lifted upwardly and under the shield 33, and is thrown upon a conveyor 36, carried at one end of the frame, and disposed transversely thereof. The edge of the conveyor outwardly from the fork is provided with an upwardly extending shield 37, to prevent the material from being thrown over the edge. The conveyor 36 is constructed of a pair of shafts 38 disposed at opposite ends of the conveyor and transversely with respect thereto. Each end of the shaft is provided with a sprocket wheel 39, for operating an endless chain 40, disposed at the opposite longitudinal sides of the conveyor. At spaced intervals of each of the chains is attached the opposite ends of conveyor slats or boards 41, movable about the sprockets with the chain and adapted to convey the material from one end of the conveyor to the other.

One of the shafts 38 is formed with an extension 42, upon which is mounted a pinion gear 43, engaging a ring gear 44, rotatably mounted on the end of the shaft 31, opposite from the pulley 30. The conveyor 36 is thus operatively connected with the tractor or other pulling vehicle. At the discharge end of the conveyor 36 is mounted a similar conveyor 45, having the ends of one of its shafts 46 journaled for rotation in the brackets 47 secured to the side of the frame and forming a pivotal support for the conveyor.

The free end of the conveyor 45 extends outwardly from the side of the frame and at such free end is arranged a bail 48, to which is attached one end of a cable 49 extending about a drum 50, keyed to a shaft 51. The shaft 51 is journaled for rotation to one of the uprights 7 and at its opposite end to a standard 52, supported at the rear end of the frame.

The shaft 51 is provided with a crank 53 and also carries a ratchet wheel 54, with which is engaged a pawl 55 for securing the shaft against movement in one direction with the cable 49 wound above the drum. Accordingly, the outer end of the conveyor 45 may be vertically adjusted so that the material discharged from the conveyor 36 onto the conveyor 45 may be subsequently discharged into a spreader or other vehicle which travels alongside of the loader at a uniform speed therewith.

The shafts of the respective conveyors at the adjacent ends are provided with sprocket wheels 56 and operatively connected with each other by an endless chain 57. A plurality of spaced apart cleaning fingers 58 are provided for the forks 32, said fingers being secured at one end to a rock shaft 59 journaled for rotation at the rear edge of the conveyor 36 and normally supported in a horizontal position by a pair of levers 60, formed at each end of the shaft, and yieldably secured against movement by a coil spring 61, attached to the side of the shield 33. The fingers 58 extend between the forks 32 and are adapted to clean the material from the forks as the same pass between the fingers. However, should a solid piece of material be picked up by the fork and deposited upon the fingers so as to prevent the passing of the forks between the fingers, the rotating force of the forks will operate to move the fingers downwardly, so that such solid material may be discharged from the fingers. Injury to the forks or the fingers is thus prevented. Belt tighteners 62 are provided for the conveyor shaft and belt tighteners 63 are provided for the belts 28 and 29. The rods 22 are yieldably supported intermediate the ends of the vertical portion of the brackets 21 by upwardly and downwardly extending springs 64, having their opposite ends attached respectively to the rods and the inner portion of the brackets.

It is obvious that the invention is susceptible of various changes and modifications, without departing from the spirit or scope of the invention or sacrificing any of its advantages, and I accordingly claim all such forms of the device to which I am entitled.

I claim:

A manure loader comprising a wheeled vehicle adapted for attaching to a drive vehicle, a vertically adjustable frame carried by said first named vehicle, a loading fork rotatably mounted on the frame, a conveyor positioned adjacent one side of the fork for receiving the material from said fork and adapted for discharging the same at one side of the frame, a common drive connection for the loading fork and the conveyor, a shield for the upper portion and one side of the fork and a scoop at the lower portion of the fork and formed as a continuation of said shield, said shield and scoop cooperating with the fork for picking up the material and depositing the same upon the conveyor.

In testimony whereof I affix my signature.

EARL H. DONNAN.